(12) United States Patent
Ripplinger et al.

(10) Patent No.: US 11,690,025 B2
(45) Date of Patent: *Jun. 27, 2023

(54) TRACKING DEVICE

(71) Applicant: Battle Sight Technologies, LLC, Dayton, OH (US)

(72) Inventors: Nicholas R. Ripplinger, Springboro, OH (US); Christopher J. Vogt, Cincinnati, OH (US)

(73) Assignee: Battle Sight Technologies, LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,050

(22) Filed: Jun. 1, 2022

(65) Prior Publication Data

US 2022/0295421 A1 Sep. 15, 2022

Related U.S. Application Data

(63) Continuation of application No. 16/844,613, filed on Apr. 9, 2020, now Pat. No. 11,368,925.

(60) Provisional application No. 62/835,642, filed on Apr. 18, 2019.

(51) Int. Cl.
  *H04W 4/00* (2018.01)
  *H04W 52/34* (2009.01)
  *H04W 4/80* (2018.01)
  *H04W 4/029* (2018.01)

(52) U.S. Cl.
  CPC .......... *H04W 52/34* (2013.01); *H04W 4/029* (2018.02); *H04W 4/80* (2018.02)

(58) Field of Classification Search
  CPC ........ H04W 52/34; H04W 4/80; H04W 4/029
  USPC ....................................................... 370/329
  See application file for complete search history.

(56) References Cited

U.S. PATENT DOCUMENTS

| | | | |
|---|---|---|---|
| 8,078,190 B2 * | 12/2011 | Noonan | H04M 1/72454 455/457 |
| 9,587,951 B1 * | 3/2017 | Hamida | G01S 19/13 |
| 11,368,925 B2 * | 6/2022 | Ripplinger | H04B 17/27 |
| 2012/0161958 A1 * | 6/2012 | Turon | G01S 19/34 340/539.3 |
| 2016/0260059 A1 * | 9/2016 | Benjamin | H04W 4/027 |
| 2018/0027517 A9 * | 1/2018 | Noonan | H04W 64/00 455/456.1 |

(Continued)

*Primary Examiner* — Marceau Milord
(74) *Attorney, Agent, or Firm* — Thomas E. Lees, LLC

(57) ABSTRACT

A method of generating a tracking beacon comprises detecting that the tracking device has been activated. The method also comprises communicating with a sensor of the tracking device to verify that the tracking device is in motion and is traveling towards an intended destination along with a payload. The method further comprises detecting that the tracking device has stopped moving after verifying that the tracking device is in motion traveling towards the intended destination and reading a position of the tracking device after detecting that the tracking device has stopped moving. The method still further comprises transmitting, after the position of the tracking device has been read, the position of the tracking device using a wireless transceiver. The method further comprises waiting a predetermined time after transmitting the position of the tracking device and transmitting a beacon signal using a short-range wireless communication after the predetermined amount of time.

17 Claims, 4 Drawing Sheets

(56) References Cited

U.S. PATENT DOCUMENTS

| | | | |
|---|---|---|---|
| 2019/0220081 A1* | 7/2019 | Wang | G06F 1/3243 |
| 2020/0327811 A1* | 10/2020 | Smith | H04W 4/02 |
| 2021/0274315 A1* | 9/2021 | Daoura | H04W 4/06 |
| 2021/0274316 A1* | 9/2021 | Laakkonen | H04W 4/021 |

* cited by examiner

TRACKING DEVICE

CROSS REFERENCE TO RELATED APPLICATIONS

This application is a continuation of U.S. patent application Ser. No. 16/844,613, filed Apr. 9, 2020, now allowed, which claims the benefit of U.S. Provisional Patent Application Ser. No. 62/835,642, filed Apr. 18, 2019, entitled "TRACKING DEVICE", the disclosure of which is hereby incorporated by reference.

BACKGROUND

Various aspects of the present disclosure relate generally to a tracking device, and in particular, to a tracking device that can be attached to a payload such as a cargo net, pallet, or other structure where short-term payload tracking is desired.

Physical assets, including supplies, tools, food, medical equipment, shelters, etc., can be moved across various locations by packing the assets into a package, such as a pallet, container, or other structure. Such packing facilitates convenient transportation. However, placing items in transit raises difficulty in reliably and accurately monitoring movement of such assets.

BRIEF SUMMARY

According to aspects of the present disclosure, a tracking device comprises a controller and a location positioning device (such as GPS). The tracking device also includes a transceiver. In use, the controller reads position information from the GPS, and telemeters the location information using the transceiver. In some embodiments, the tracking device includes two transceivers, including a short-range wireless transceiver (such as Bluetooth), and a second transceiver that facilitates relatively longer-range communication compared to the short-range wireless transceiver. In alternative embodiments, the location positioning device is not required, such as where the tracking device includes a beacon or other absolute or relative locating device and/or locating functionality. The tracking device can also and/or alternatively include sensors and other features, examples of which are described more fully herein.

According to further aspects of the present disclosure, an example method of generating a tracking beacon is disclosed. The method describes operations carried out by a controller on a tracking device to provide short term tracking of a payload to which the tracking device is attached. The method comprises detecting that the tracking device has been activated. The method also comprises communicating with a sensor of the tracking device to verify that the tracking device is in motion and is traveling towards an intended destination along with a payload. The method further comprises detecting that the tracking device has stopped moving after verifying that the tracking device is in motion traveling towards the intended destination and reading a position of the tracking device after detecting that the tracking device has stopped moving. The method still further comprises transmitting, after the position of the tracking device has been read, the position of the tracking device using a wireless transceiver. For instance, the tracking device can send GPS coordinates to a device carried by a user that is tasked with recovering the payload. In some embodiments, the method may further comprise waiting a predetermined time after transmitting the position of the tracking device and transmitting a beacon signal using a short-range wireless communication after the predetermined amount of time. For instance, the tracking device can use Bluetooth or other short-range wireless communication to communicate with a device carried by a user tasked to recover the payload. Several other example methods of transmitting a beacon are described in greater detail herein.

DETAILED DESCRIPTION

Applications exist where a payload needs to be moved such that custody of the payload changes from one responsible party (e.g., group, individual, entity, etc.) to another. As an illustrative example, in an aerial drop, a payload, e.g., a pallet of goods, is bundled in a cargo net, and the payload is parachuted to the ground. Due to the unpredictability in wind, shifting load, and other dynamic conditions, the payload may not land exactly at a designated drop point. Moreover, when dropping a payload into a natural environment, it is possible that locating the payload may be relatively difficult, e.g., due to terrain, forestation, weather, and other natural conditions.

However, aspects herein address the above-problem and provide an unconventional solution thereto by providing a tracking device and methods of use. The tracking device can be attached to a payload for tracking thereof. In typical applications, the tracking is carried out over a short term, e.g., potentially less than a few hours, e.g., long enough to track and recover a payload that has been air dropped, etc. Of course, there are numerous other applications where it is necessary to perform short-term tracking of a payload. Moreover, the time that tracking is available can vary depending upon the application. As such, the tracking device is not limited to tracking over a particular duration.

Figure 1:
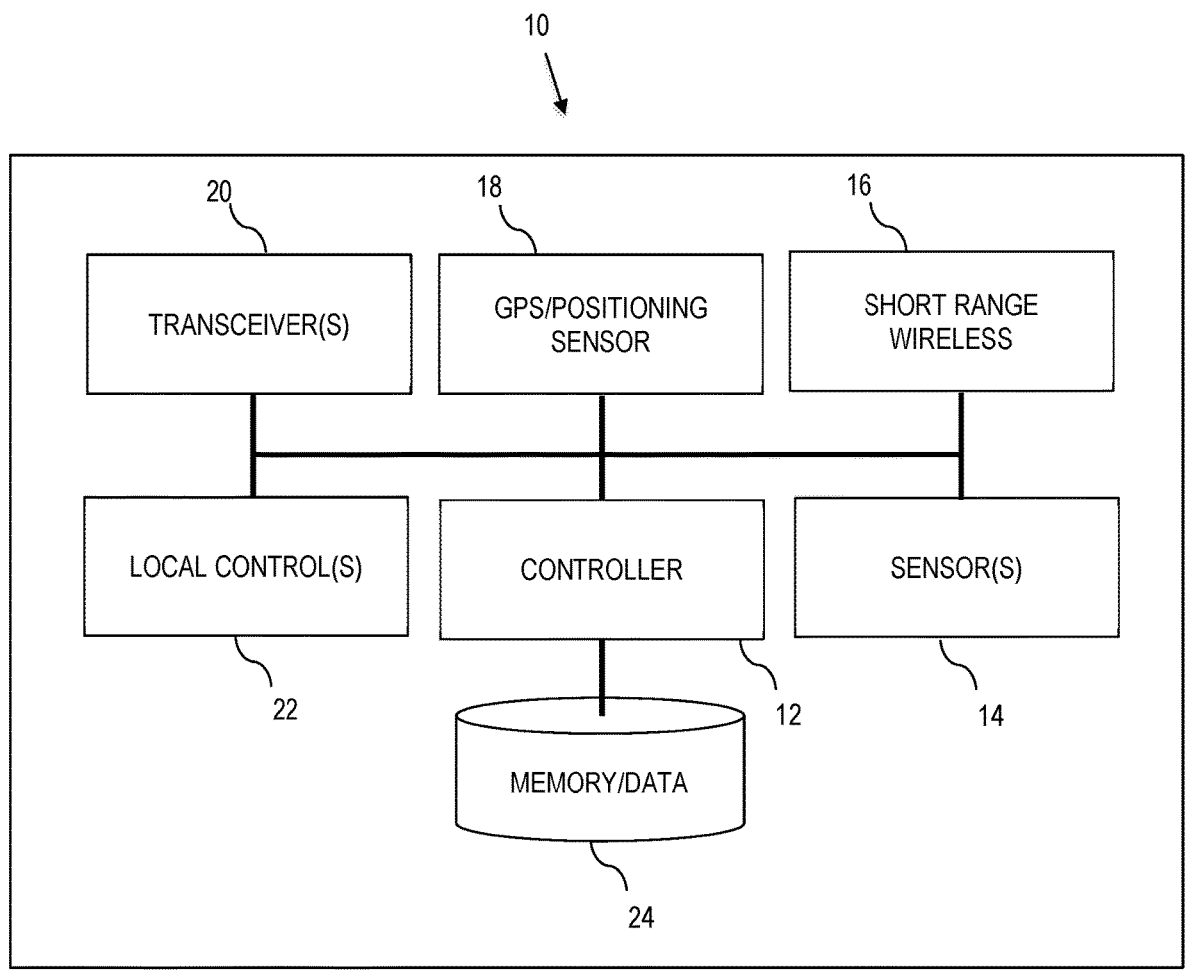
FIG. 1 is a schematic block diagram of a tracking device, according to aspects of the present disclosure.

Referring now to the drawings, and in particular, to FIG. 1, a tracking device 10 is illustrated in block diagram form, for clarity of discussion herein. In general, the illustrated tracking device 10 includes a controller 12. The controller 12 is communicably coupled to one or more sensor(s) 14, one or more short-range wireless device(s) 16, a positioning sensor 18, at least one transceiver 20, one or more controls 22, and memory 24.

In practical applications, the above-described components are not all necessary or needed. As such, embodiments herein contemplate that the controller 12 is communicably coupled to sensor(s) 14, short-range wireless device(s) 16, the positioning sensor 18, the transceiver 20, controls 22, and memory 24 in any combination of components thereof. Moreover, additional components may be incorporated into the tracking device 10 as the application dictates.

In some embodiments, the sensor 14 is optional. However, in other embodiments, the tracking device 10 includes at least one sensor 14 such as an accelerometer, altimeter, barometer, force sensor, gyroscope, inertial measurement unit, magnetometer, optical sensor, temperature sensor, air quality sensor, combinations thereof, etc. As will be described herein, the sensor(s) 14 can carry out various functions, including functioning as a switch, detecting movement, detecting lack of movement, detecting orientation, position, etc. As such, some embodiments may include a single sensor 14, whereas other embodiments can include multiple sensors 14, each tasked to carry out a specific function in device tracking.

As noted above, the tracking device 10 can optionally include at least one short-range wireless communication device 16. Example short-range wireless devices include a Bluetooth device, ultra-wideband (UWB) device, Zigbee device, WiFi device, etc. The short-range wireless device 16 can be used for local communication with a device controlled by a user tasked with recovery of a payload to which the tracking device 10 is attached, as will be described more fully herein.

The optional positioning sensor 18 can include a device such as a global positioning system receiver, environmental based location tracking device, or other positioning device that can localize or otherwise identify a position/location of the tracking device 10, e.g., using local coordinates, absolute coordinates, etc.

The tracking device 10 can also optionally include at least one transceiver 20. As a few illustrative examples, the transceiver 20 can include a cellular transceiver, Low-Power Wide Area Network (LPWAN), LoRa (long range) device, narrowband TOT (Internet of things), LTE (long-term evolution) Cat M1, WiFi (wireless fidelity), etc. In this regard, the transceiver 20, where provided, is a long-range transceiver, at least relative to the short-range wireless device 16.

The optional controls 22 can include physical or virtual switches, encoders, buttons, LEDs (light-emitting diodes)/illumination devices, a transducer/speaker, or other interface I/O (input/output) devices that allow an operator to access and utilize the tracking device 10. For instance, an optional control 22 can include a switch that allows a user to power up the tracking device 10 for use. In some embodiments, a control 22 implementing an I/O device such as an illumination device (e.g., LED), transducer, etc., can show a state of the tracking device 10, e.g., powered on, transmitting, reading sensors, writing to an output/memory, etc. In other embodiments, a control 22 implementing an I/O device such as an illumination device (e.g., LED), transducer, etc., can function as a beacon, which can operate independently of (e.g., in conjunction with or in lieu of) transmitting position information via the short-range wireless 16 or transceiver 20.

In some embodiments, the tracking device 10 comprises a memory 24. The memory 24 can be implemented as a data source, memory space for storing program code executable by the controller 12, for storing a device identifier and/or other identifying information, for storing security information, operating parameters, set points, data collection gathered during use, any combination thereof, etc.

Figure 2:
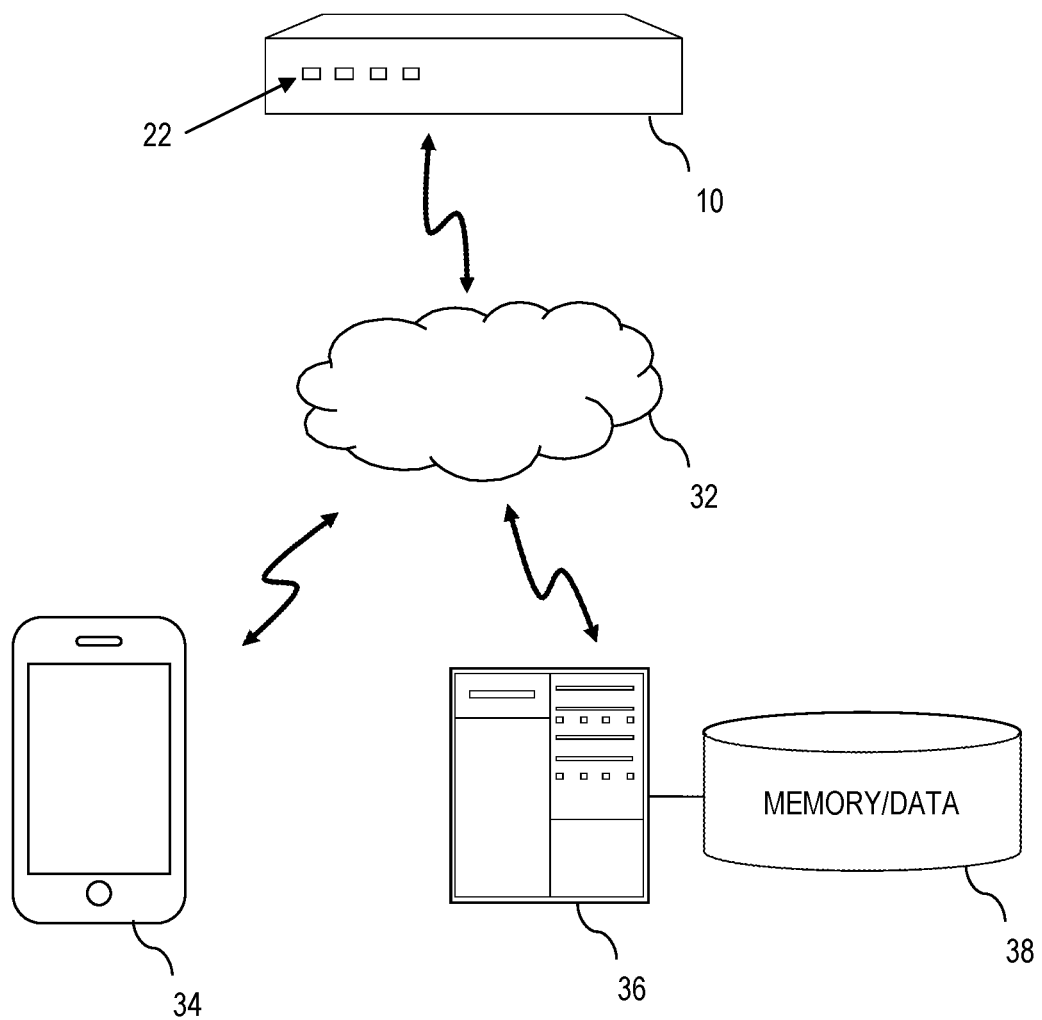
FIG. 2 is a schematic diagram illustrating the tracking device of FIG. 1 communicating with one or more remote devices, according to aspects herein.

Referring to FIG. 2, in some embodiments, the tracking device 10 telemeters, broadcasts, emits, or otherwise communicates across one or more wireless networks 32 to provide information accessible by remote processing devices, e.g., a portable computing device 34, a computer 36, combination thereof, etc.

The network 32 provides communications links between the various processing devices and may be supported by networking components that interconnect the processing devices, including for example, routers, hubs, firewalls, network interfaces, wired or wireless communications links and corresponding interconnections, cellular stations and corresponding cellular conversion technologies (e.g., to convert between cellular and TCP/IP (transmission control protocol/Internet protocol), etc.). Moreover, the network(s) 32 include connections using device to device wireless communication, a cluster, a mesh or device linking technology using wireless communication, one or more network configurations (examples of which include intranets, extranets, local area networks (LAN), wide area networks (WAN), wireless networks (WiFi), the Internet, including the world wide web, cloud infrastructure), cellular, other arrangements for enabling communication between the processing devices, combinations thereof, etc.

In this regard, the term "network" should be construed broadly. Non-limiting examples of technology that leverage network communication include, but are not limited to communication using microwave, RF, satellite, cellular, lidar, light, spread spectrum, Bluetooth, ultra-wide band, other, etc.

Also, while shown as a portable computing device 34 and a computer 36, the remote processing devices can include a server, personal computer, laptop computer, netbook computer, tablet, purpose-driven appliance, special purpose computing device, personal data assistant (PDA) processor, palm computer, cellular device including cellular mobile telephone, smartphone, an information processing device, etc.

Moreover, in some embodiments, the computer 36 can be linked to a remote database 38, e.g., to store data linking the tracking device 10 to a payload, e.g., via a manifest or other suitable electronic association. As an example, the tracking device 10 can be activated, e.g., by pressing a control 22 on the tracking device 10 to power up the device. An identifier can be assigned to the tracking device 10, or an identifier can be read from the tracking device 10. Regardless, the identifier is communicated to the computer 36, that stores the identifier in memory 38, along with a manifest of the contents of a payload to which the tracking device 10 is attached.

For instance, the tracking device 10 can be attached to a cargo net carrying a payload. Either before loading into a manned or unmanned vehicle (e.g., plane, helicopter, drone, etc.) or while in the air, the identifier of the tracking device 10 is associated with the cargo net/payload. When the payload is dropped from the aerial vehicle, the tracking device 10 assists in the recovery of the payload. In an example implementation, a manifest/inventory/tracking information is communicated from the memory 38 to the remote portable device 34 via the computer 36 and the network 32. Moreover, the tracking device 10 communicates with the remote portable device 34, e.g., by sending GPS coordinates when the payload has landed, by sending a beacon, by responding to a pairing request issued by the remote portable device 34, combination thereof, etc. Thus, an entity on the ground can recover the payload and know its contents.

In other examples, the tracking device 10 can be attached to a source carrying a payload, e.g., a robot, autonomous vehicle, remote guided vehicle, etc. In this regard, any of the aspects, methods, devices, techniques, etc., herein can be implemented in the context of the tracking device 10 coupled to a payload, regardless of the delivery mechanism that carries the payload.

Below is a series of example uses of the tracking device 10 in various configurations. For sake of illustration, and not by way of limitation, the below examples are presented in an application where the tracking device 10 is attached to a cargo net for purposes of dropping a payload via an airdrop. Other uses can be implemented without departing from the spirit and scope of the present disclosure. The below examples are made by reference to FIG. 1 and FIG. 2, generally.

Example 1

In a first example implementation, the tracking device 10 includes at least, the controller 12, a positioning sensor 18 (e.g., GPS receiver), and a transceiver 20. The tracking device 10 is coupled to a payload, e.g., by attaching the tracking device 10 to a cargo net that is intended to drop a payload out of an aerial vehicle, e.g., an airplane, helicopter, etc. The present implementation is a simplified implementation suitable for training exercises in dropping and recovering payloads. A user powers up the tracking device 10 before the payload is dropped from the aerial vehicle.

Under this configuration, a method of generating a tracking beacon comprises repeatedly performing by the controller 12, a cyclical operation that comprises reading the position of the tracking device 10 and hence, the location of the payload. This can be carried out by the controller reading position data from the position sensor 18, such as by reading data collected from GPS receiver. The method also comprises telemetering, by the controller 12 using the transceiver 20, the previously read location coordinates, e.g., using a long-range wireless transmission technology. A corresponding remote device, e.g., remote portable device 34 possessed by a user on the ground, receives the location coordinates to facilitate effective recovery of the payload by identifying the exact coordinates of the payload.

In some variations of the above-example, the location coordinates can be repeatedly transmitted, or periodically transmitted, e.g., every 10 seconds or less. In some example embodiments, the transmission/telemetering of location coordinates can occur as the payload is dropping to the ground and after the payload has landed. In other embodiments, the telemetering of the location information can begin once the payload has landed on the ground. In some embodiments, the tracking device 10 transmits the location information a pre-determined number of times before transmission ceases, e.g., once, a few times, etc., or the transmission of location information can persist indefinitely until the payload is recovered or power to the tracking device 10 wears out.

Example 2

In a second example implementation, the tracking device 10 includes at least, the controller 12, at least one short-range wireless device 16 (e.g., Bluetooth), a positioning sensor 18 (e.g., GPS receiver), a transceiver 20, and a local control 22, e.g., a power enabling switch on the tracking device 10. The tracking device 10 is coupled to a payload, e.g., by attaching the tracking device 10 to a cargo net that is intended to drop a payload out of an aerial vehicle, e.g., an airplane, helicopter, etc. The present implementation is a suitable for training exercises and other activities that involve dropping and recovering payloads. An individual energizes the tracking device 10 before the device is dropped from the aerial vehicle by engaging the local control 22 (e.g., power switch).

Using the above-hardware configuration, a method 300 of generating a tracking beacon comprises at 302 detecting that the tracking device 10 has been activated. For instance, the controller 12 can detect that the tracking device 10 has been activated by virtue of powering up. Alternatively, where already energized, the controller 12 may wake up responsive to detecting a change in state or actuation of a signal. In some embodiments, detecting that the tracking device 10 has been activated comprises detecting that an operator has mechanically activated a control on the tracking device 10 that causes the tracking device 10 to energize, e.g., a user on the aerial vehicle can switch the tracking device 10 on using a local control 22, such as a power switch.

In some embodiments, at 304, the method can further comprise reading an identifier stored on the tracking device 10 and storing the identifier in a database, e.g., memory 38, which associates the identifier with a payload that the tracking device 10 is attached to. In this example, after a user switches the tracking device 10 on using the local control 22, the user can read an identifier in the tracking device, such as by reading an RFID tag. Alternatively, the user can write a unique identifier into a memory, e.g., by writing to a memory 24 of the tracking device 10. At 306, the method can further comprise wirelessly transmitting a record to a remote device of a user located proximate to the intended destination, e.g., the remote processing device 34 in FIG. 2. In this example, the record can contain the identifier and at least one detail characterizing the payload, such as a manifest of the payload contents. In yet additional embodiments, at 308, the method can comprise wirelessly transmitting a record that contains a security key for communicating with the tracking device 10. For instance, the controller 12 may require a secure communication be established with a remote device before disclosing the GPS or other localization coordinates. This can also be utilized to share a unique pairing code, such as for secure Bluetooth connections when using short-range communication as described in greater detail below.

At 310, the method also comprises communicating (e.g., by the controller 12) with a sensor of the tracking device 10 to verify that the tracking device 10 is in motion and is traveling towards an intended destination along with a payload. Here, the determination that the tracking device 10 is attached to a payload can be inferred from its use. In some embodiments, the sensor is the positioning device 18, e.g., a GPS receiver. By way of example, the controller 12 can carry out an algorithm that includes taking a first position measurement at a first time (e.g., taking a first GPS reading using the positioning device 18), taking a second position measurement at a second time (e.g., taking a second GPS reading using the positioning device 18), and comparing the first position measurement to the second position measurement. In practical applications, any number of additional measurements can also be taken. In alternative embodiments, the sensor can be implemented by one or more of the sensors 14. For instance, the controller 12 can verify that the tracking device 10 is in motion and is traveling towards an intended destination along with a payload by monitoring a sensor 14 such as an accelerometer, a magnetometer, a gyroscope, an inertial measurement unit, a barometer, a combination thereof, etc.

At 312, the method further comprises detecting that the tracking device 10 has stopped moving after verifying that the tracking device 10 is in motion traveling towards the intended destination. For instance, the controller 12 can detect that the tracking device 10 has stopped moving by receiving a signal from the sensor 14, e.g., an accelerometer, magnetometer, gyroscope, altimeter, barometer, or inertial measurement unit that functions as a switch to trigger reading the position of the tracking device upon detecting that the tracking device 10 has stopped moving (or has stopped dropping towards the ground). As another example, the controller 12 can detect that the tracking device has stopped moving by taking a global positioning system reading.

At 314, The method still further comprises reading a position of the tracking device after detecting that the tracking device has stopped moving, such as reading GPS coordinates from the positioning sensor 18. Moreover, the method comprises transmitting the position of the tracking device using a wireless transceiver. For instance, the controller 12 can transmit the position a predetermined number of times using a long range wireless transmitter such as a low power wide area network transceiver, e.g., the transceiver 20, after which transmitting the position of the tracking device using the long range wireless transmitter ceases.

At 316, the method yet further comprises waiting a predetermined time after transmitting the position of the tracking device and transmitting a beacon signal using a short-range wireless communication, e.g., using at least one of Bluetooth, ultra-wide band, WiFi, or Zigbee. Here, the predetermined time can be instantly after transmitting the GPS location, or some predetermined time. For instance, to conserve power, the tracking device 10 may wait 5-30 minutes before engaging its short-range beacon, such as a Bluetooth pairing/Discovery signal. Alternative wait times may be implemented. In other embodiments, the tracking device 10 can repeatedly broadcast the GPS location in addition to, or in lieu of, transmitting a short-range pairing signal.

In other embodiments, waiting for a predetermined time may comprise monitoring for the presence of a wireless signal in short range, ascertaining that the wireless signal has an identifier that corresponds to an authentic remote device and transmitting the beacon signal after detecting the authentic remote device.

In some embodiments, it may not be desirable for the tracking device 10 to actively broadcast information. In this regard, the tracking device 10 can implement passive monitoring. For instance, the tracking device 10 may transmit the GPS coordinates a limited number of times, e.g., once. Alternatively, the tracking device 10 may not transmit its GPS coordinates at all. For instance, the remote device 34 may be pre-loaded with the GPS coordinates of an intended drop location or other payload retrieval destination. This may be implemented where a ground recovery unit is on the ground proximate to the payload or is heading for the payload. In alternative embodiments, there may be various reasons not to broadcast actively. Here, the tracking device 10 can utilize at least one antenna to listen for an authorized signal. For instance, a user with an authorized device, e.g., the remote processing device 34 can broadcast a signal with a request to pair using a secret key known to the tracking device 10.

When the tracking device 10 hears the signal from the authorized device, e.g., the remote processing device 34, the tracking device 10 wakes up and transmits its GPS coordinates, a pairing signal, a beacon, a confirmation, a combination thereof, etc. A user can then localize the location of the payload. This approach does require that the remote device come within short range, e.g., 50-100 meters. However, wireless communication is minimized by the tracking device 10. Moreover, once the remote device is within short range, the exact position of the payload can be conveyed for rapid recovery.

In some embodiments, the tracking device 10 can be programmed to send a beacon using techniques other than wireless transmission. For instance, the tracking device 10 can listen for the presence of a Bluetooth pairing signal from a nearby remote processing device 34 that is programmed to transmit an appropriate security key. Responsive to "hearing" the correct key, the tracking device 10 can initiate a beacon signal via a control 22 such as an LED, an infrared LED, a sound, or other output. In yet further embodiments, use of one or more controls 22 to serve as a beacon can be used by the tracking device 10 in conjunction with or in lieu of, a wireless transmission of location (absolute or relative).

Example 3

In this exemplary implementation, any of the above-example tracking device configurations described with reference to FIG. 1 and FIG. 2 can be utilized to track a payload. However, in this example, multiple tracking devices 10 are provided on a single payload, e.g., four tracking devices 10, such as one on each corner of a pallet holding the payload. This provides redundancy in case one or more of the tracking devices 10 are damaged in the decent from the aerial vehicle to the ground. Moreover, having multiple readings on the same payload can provide valuable information about the condition of the payload, e.g., whether the payload landed flat, one its side, etc.

Example 4

In this exemplary implementation, any of the above-example tracking device configurations described with reference to FIG. 1 and FIG. 2 can be utilized to track a payload. However, in this example, multiple tracking devices 10 are provided, such as where multiple payloads are dropped at the same time. For instance, when dropping multiple payloads, e.g., 6-10 pallets, it is likely that dynamic factors such as payload weight, weight distribution, changing wind conditions, etc., will cause the various payloads to scatter about an area, making recovery difficult. However, in this example embodiment, before the payloads are dropped from the aerial vehicle, data is stored to the data source 30, which includes an identifier of each tracking device 10, and the contents of the associated payload. As such, the remote device can read a manifest or other data from the data source, and know what each payload contains, and via the tracking devices, knows where each payload is. The manifest thus allows the user on the ground to combine knowledge of the GPS coordinates of each payload with the payload contents such that a schedule, path, route planning, and payload prioritization can be implemented. Here, path planning can be based upon importance of the various payloads, location of the payloads, combination thereof, etc.

Example 5

As noted more fully herein, any of the above-example tracking device configurations described with reference to FIG. 1 and FIG. 2 can be utilized to track a payload. Moreover, in some embodiments, such as when dropping a payload, a known or expected location is known. For instance, a designated drop point or radius may be established. However, due to dynamic conditions, the payload may not land within the designated drop radius. However, according to aspects herein, the tracking device 10 can include the ability to access a GPS receiver. As such, the tracking device 10 can read and/or otherwise record, an actual drop position for the payload. Using this information, the tracking device 10, remote portable device 34, computer 36, combinations thereof, etc., can compute an offset of the actual payload landing point to the target location/radius. Thus, a drop accuracy verification function can be implemented.

Drop accuracy verification can be used, for instance, to score or otherwise evaluate the ability of an entity to correlate a payload initiation time/location (e.g., when a payload is dropped from a vehicle) with the ultimate resting location of the payload relative to the intended drop location. A score may be based upon a distance an actual payload resting location is from a target landing area. Moreover, because the tracking device 10 can include sensors 14, such as an inclinometer, gyroscope, barometer, inertial measurement unit, temperature sensor, air quality sensor, etc., the tracking device 10 can collect and log event data while in transit. This logged transit data can be used retrospectively to stratify or provide attribution to the reason there is (or is not) a difference between the actual payload resting location and the target location. Moreover, collected sensor data can be analyzed for other purposes. For instance, in some embodiments, the tracking device 10 can telemeter sensor readings while the payload is in transit, e.g., back to a vehicle that dropped the payload. This data can be analyzed to provide real-time adjustment to future drops. Alternatively, or additionally, some sensor data can be transmitted to the remote device 34 of an entity dispatched to recover the payload. For instance, temperature, air quality, impact force, orientation, other information, combinations thereof, collected while in transit and/or after landing can be communicated by the tracking device 10 to a separate device, e.g., to the remote processing device 34. This can facilitate recovery action plans, e.g., to ensure proper recovery tools are brought to the payload location.

Understanding the offset of a payload from a fixed point allows the entity responsible for recovery to establish a suitable recovery plan. When multiple payloads are dropped and tracked, understanding the offset of each payload from a designated recovery point enables prioritization, path planning, and other recovery decision support that can be based upon location, manifest/content of the payloads, a combination thereof, etc.

Yet further, in some embodiments, instead of transmitting actual absolute coordinates, the tracking device 10 can provide relative position information. For instance, when a user powers up a tracking device 10, a user can program into memory 24, coordinates of an intended drop location. When the payload lands, the tracking device 10 can read the payload location using a GPS receiver, and compute the offset of the payload from the intended drop location. In this manner, the tracking device 10 can telemeter, broadcast or otherwise communicate relative coordinates that are either precise or approximate, e.g., 500 meters southwest of designated drop location, as a non-limiting, illustrative example.

Miscellaneous:

In some embodiments, the payload may be an individual, e.g., such as an individual parachuting from an aerial vehicle. In this regard, the tracking device 10 can include sensors 14 that are read by the controller to collect temperature, air quality, impact force upon landing, orientation, other information, combinations thereof, collected while in transit and/or after landing. This enables data to be collected and analyzed to retrospect specific jump data, to create data that can be analyzed for future uses, etc. In this regard, the collected sensor data can be communicated by the tracking device 10 to a separate device, e.g., to the remote processing device 34, computer 36, etc.

Example Computer System

Figure 4:
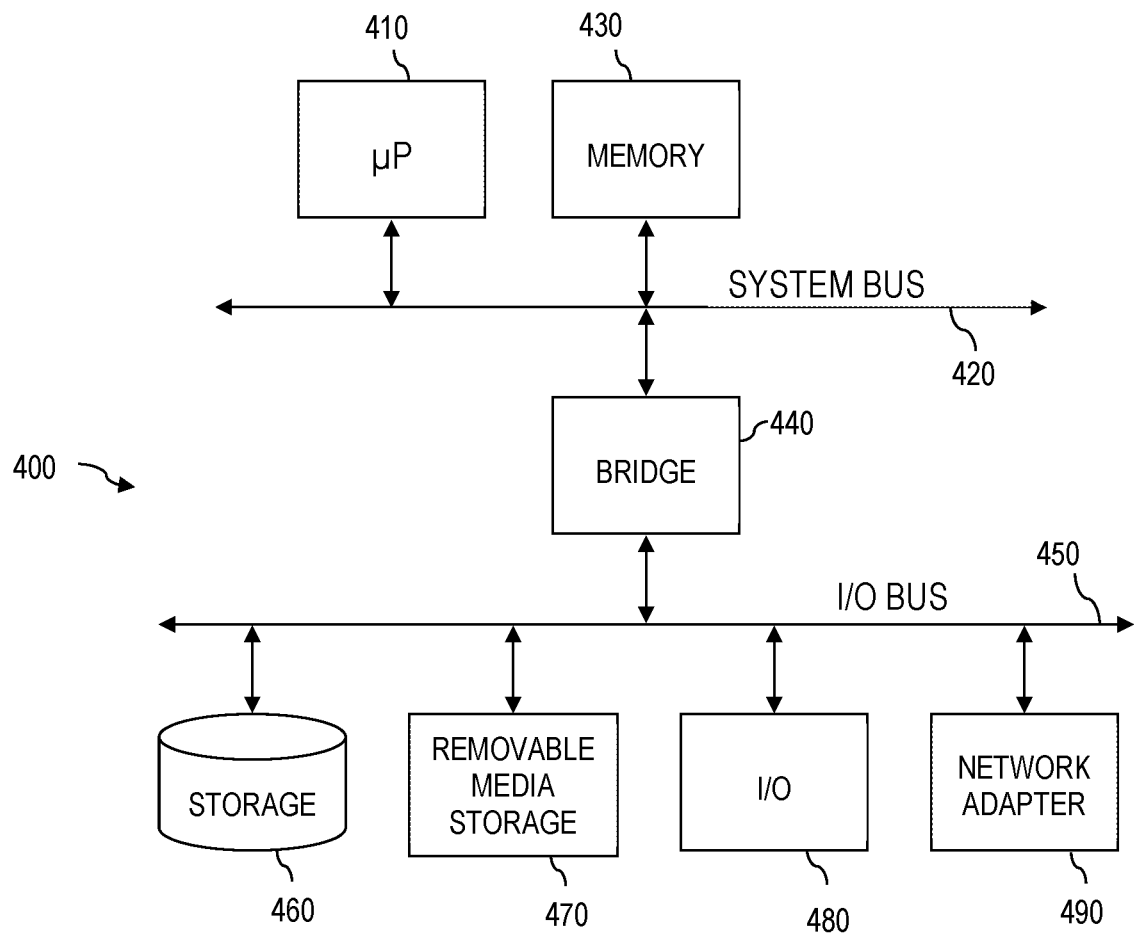
FIG. 4 is a block diagram of a computer system having a computer readable storage medium for implementing functions according to various aspects of the present disclosure as described in greater detail herein.

Referring to FIG. 4, a block diagram of a hardware data processing system is depicted in accordance with the present disclosure. Any one or more of the components described with reference to FIG. 4 can be used for instance, to implement the controller 12 and/or other components of the tracking device 10. Data processing system 400 may comprise a symmetric multiprocessor (SMP) system or other configuration including a plurality of processors 410 connected to system bus 420. Alternatively, a single processor 410 may be employed. Also connected to the system bus 420 is local memory 430. An I/O bus bridge 440 interfaces the system bus 420 to an I/O bus 450. The I/O bus 450 is utilized to support one or more buses and corresponding devices, such as storage 460, removable media storage 470, input/output devices 480, network adapters 490, other devices, combinations thereof, etc. For instance, a network adapter 490 can be used to enable the data processing system 400 to communicate with other remote processing systems, storage devices, etc., through intervening private or public networks.

Figure 3:
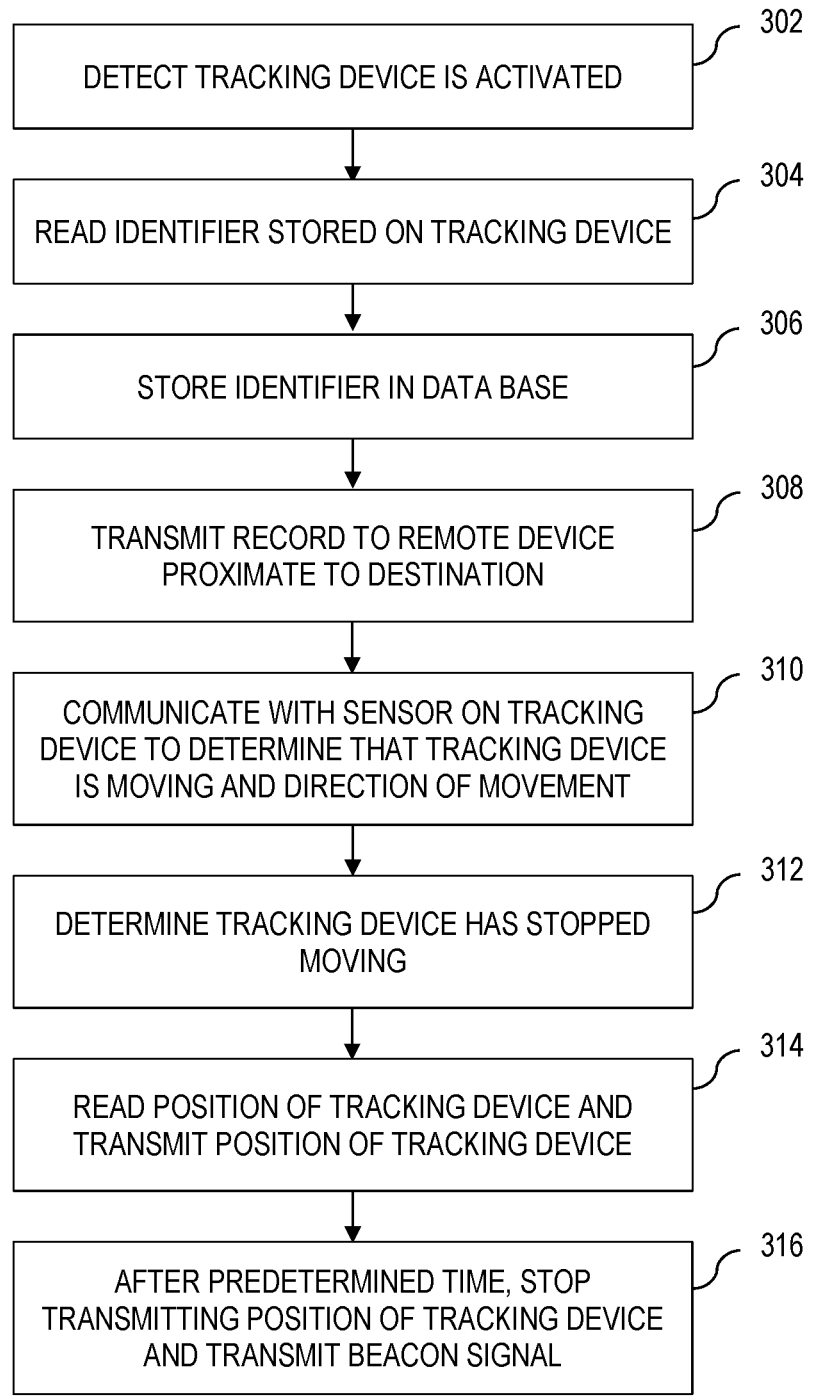
FIG. 3 is a flow chart describing a method for generating a tracking beacon using tracking devices described herein, according to various aspects of the present disclosure.

The memory 430, storage 460, removable media storage 470, or combinations thereof can be used to store program code that is executed by the processor(s) 410 to implement any aspect of the present disclosure described and illustrated in FIGS. 1-3.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a device, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A method of generating a tracking beacon, the method comprising:
   detecting that a tracking device has been activated;
   communicating with a sensor of the tracking device to verify that the tracking device is in motion and is descending towards an intended destination along with a payload;
   detecting that the tracking device has stopped descending after verifying that the tracking device is in motion descending towards the intended destination;
   reading a position of the tracking device after detecting that the tracking device has stopped descending;
   transmitting, after the position of the tracking device has been read, the position of the tracking device using a wireless transceiver;
   waiting a predetermined time after transmitting the position of the tracking device; and
   transmitting a beacon signal using a short-range wireless communication after the predetermined amount of time.

2. The method of claim 1, wherein:
   detecting that a tracking device has been activated comprises detecting that an operator has activated a control on the tracking device that causes the tracking device to energize.

3. The method of claim 1 further comprising:
   reading an identifier stored on the tracking device.

4. The method of claim 3 further comprising:
   wirelessly transmitting a record to a remote device of a user located proximate to the intended destination, wherein the record includes the identifier.

5. The method of claim 4, wherein:
   wirelessly transmitting a record further comprises wirelessly transmitting a record that contains a security key for communicating with the tracking device.

6. The method of claim 1, wherein:
   communicating with a sensor of the tracking device to verify that the tracking device is in motion and is descending towards an intended destination along with a payload comprises:
   taking a first position measurement at a first time;
   taking a second position measurement t a second time; and
   comparing the first position measurement to the second position measurement.

7. The method of claim 6, wherein:
   taking a first position measurement at a first time, comprises:
   taking a first global positioning system reading; and
   taking a second position measurement t a second time, comprises:
   taking a second global positioning system reading.

8. The method of claim 1, wherein:
   communicating with a sensor of the tracking device to verify that the tracking device is in motion and is descending towards an intended destination along with a payload comprises monitoring a sensor comprising an accelerometer, a magnetometer, or a gyroscope.

9. The method of claim 1, wherein:
   communicating with a sensor of the tracking device to verify that the tracking device is in motion and is descending towards an intended destination along with a payload comprises monitoring a sensor comprising an inertial measurement unit.

10. The method of claim 1, wherein:
    detecting that the tracking device has stopped descending after verifying that the tracking device is in motion descending towards the intended destination, comprises:
    receiving a signal from an accelerometer, magnetometer, gyroscope, altimeter, or inertial measurement unit that functions as a switch to trigger reading the position of the tracking device.

11. The method of claim 1, wherein:
    reading a position of the tracking device after detecting that the tracking device has stopped descending, comprises taking a global positioning system reading.

12. The method of claim 1, wherein:
    transmitting the position of the tracking device using a wireless transceiver, comprises transmitting the position a predetermined number of times using a long range wireless transmitter, after which transmitting the position of the tracking device using the long range wireless transmitter ceases.

13. The method of claim 12, wherein:
    transmitting the position of the tracking device using the long-range wireless transmitter comprises transmitting using a low power wide area network transceiver.

14. The method of claim 1, wherein:
    transmitting a beacon signal using a short-range wireless communication comprises transmitting using at least one of Bluetooth, ultra-wide band, WiFi, or Zigbee.

15. The method of claim 1, wherein:
    waiting a predetermined time after transmitting the position of the tracking device, comprises:
    monitoring for the presence of a wireless signal in short range; and
    ascertaining that the wireless signal has an identifier that corresponds to an authentic remote device; and transmitting a beacon signal using a short-range wireless communication comprises:
   transmitting the beacon signal after detecting the authentic remote device.

16. The method of claim 15, wherein:
monitoring for the presence of a wireless signal in short range comprises monitoring passively without transmitting a signal.

17. The method of claim 1, wherein:
transmitting the position of the tracking device using a wireless transceiver comprises:
   computing an offset as a distance of the tracking device from a designated position; and
   transmitting the position of the tracking device as the offset from the designated position.

* * * * *